(12) United States Patent
Park et al.

(10) Patent No.: US 11,805,837 B2
(45) Date of Patent: Nov. 7, 2023

(54) PERSONAL MOBILITY DEVICE AND CONTROL METHOD THEREOF

(71) Applicants: Hyundai Motor Company, Seoul (KR); Kia Motors Corporation, Seoul (KR)

(72) Inventors: Minjae Park, Gyeonggi-do (KR); Jong Bok Lee, Gyeonggi-do (KR); Seunghyun Woo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 668 days.

(21) Appl. No.: 17/038,576

(22) Filed: Sep. 30, 2020

(65) Prior Publication Data
US 2021/0284267 A1    Sep. 16, 2021

(30) Foreign Application Priority Data

Mar. 12, 2020 (KR) .................. 10-2020-0030642

(51) Int. Cl.
*A42B 3/04* (2006.01)
*B62J 11/24* (2020.01)
(Continued)

(52) U.S. Cl.
CPC .......... *A42B 3/0466* (2013.01); *B60R 25/25* (2013.01); *B60W 50/14* (2013.01); *B62H 5/00* (2013.01); *B62J 9/10* (2020.02); *B62J 11/24* (2020.02); *B62J 27/00* (2013.01); *B62J 45/20* (2020.02); *A42B 3/006* (2013.01); *A42B 3/0406* (2013.01); *A42B 3/046* (2013.01); *A42B 3/0413* (2013.01); *B60W 2540/225* (2020.02); *B62J 3/14* (2020.02); *B62J 45/413* (2020.02); *B62J 45/414* (2020.02)

(58) Field of Classification Search
None
See application file for complete search history.

(56) References Cited

U.S. PATENT DOCUMENTS 9,247,779 B1 * 2/2016 Aloumanis .......... A42B 3/0426
2015/0305426 A1 * 10/2015 Lee ........................ A42B 3/046
                                                                340/539.12

(Continued)

FOREIGN PATENT DOCUMENTS

CN      208030393 U  * 11/2018
CN      109393624 A  *  3/2019  ............... A42B 1/08
(Continued)

*Primary Examiner* — Kevin R Steckbauer
(74) *Attorney, Agent, or Firm* — Fox Rothschild LLP

(57) ABSTRACT

A personal mobility device includes a helmet, for example, when renting the personal mobility device, and can improve user safety based on an output of a sensor provided in the helmet. The personal mobility device further includes: a transceiver; a helmet storage device in which the helmet provided with at least one sensor is stored; and a controller configured to control the transceiver to be wirelessly connected to the helmet when receiving a signal indicating separation between the helmet storage device and the helmet from the helmet storage device, and to control the transceiver to transmit a signal requesting the activation of the at least one sensor to the helmet.

20 Claims, 11 Drawing Sheets

(51) Int. Cl.
  *B60R 25/25*   (2013.01)
  *B60W 50/14*   (2020.01)
  *B62H 5/00*    (2006.01)
  *B62J 27/00*   (2020.01)
  *B62J 9/10*    (2020.01)
  *B62J 45/20*   (2020.01)
  *A42B 3/00*    (2006.01)
  *B62J 3/14*    (2020.01)
  *B62J 45/413*  (2020.01)
  *B62J 45/414*  (2020.01)

(56) References Cited

U.S. PATENT DOCUMENTS

| | | | | |
|---|---|---|---|---|
| 2018/0007994 | A1* | 1/2018 | Boesen | A42B 3/30 |
| 2020/0297059 | A1* | 9/2020 | Viner | G07F 17/0057 |
| 2021/0274875 | A1* | 9/2021 | Glenn | A42B 3/0466 |
| 2021/0284267 | A1* | 9/2021 | Park | B62J 27/00 |
| 2021/0315303 | A1* | 10/2021 | Daddi | A42B 3/08 |

FOREIGN PATENT DOCUMENTS

| | | | | | |
|---|---|---|---|---|---|
| CN | 110763282 | A | * | 2/2020 | |
| CN | 111671193 | A | * | 9/2020 | |
| CN | 111688850 | A | * | 9/2020 | B62J 11/24 |
| CN | 111798595 | A | * | 10/2020 | |
| CN | 112869275 | A | * | 6/2021 | |
| CN | 213587547 | U | * | 7/2021 | |
| CN | 214315255 | U | * | 9/2021 | |
| CN | 113647715 | A | * | 11/2021 | |
| CN | 214547622 | U | * | 11/2021 | |
| CN | 111688850 | B | * | 12/2021 | B62J 11/24 |
| CN | 113788093 | A | * | 12/2021 | |
| CN | 114104154 | A | * | 3/2022 | |
| CN | 114371655 | A | * | 4/2022 | |
| CN | 216401610 | U | * | 4/2022 | |
| CN | 114451623 | A | * | 5/2022 | |
| CN | 114468449 | A | * | 5/2022 | |
| CN | 216493716 | U | * | 5/2022 | |
| CN | 216665297 | U | * | 6/2022 | |
| CN | 216684693 | U | * | 6/2022 | |
| CN | 114698895 | A | * | 7/2022 | |
| CN | 114711503 | A | * | 7/2022 | |
| CN | 115191705 | A | * | 10/2022 | |
| CN | 115320772 | A | * | 11/2022 | |
| CN | 115393984 | A | * | 11/2022 | |
| CN | 217791622 | U | * | 11/2022 | |
| CN | 115436952 | A | * | 12/2022 | |
| CN | 116098340 | A | * | 5/2023 | |
| CN | 116114957 | A | * | 5/2023 | |
| DE | 102015207294 | A1 | * | 10/2015 | A42B 3/046 |
| DE | 202022105073 | U1 | * | 11/2022 | |
| EP | 3949779 | A1 | | 2/2022 | |
| WO | WO-2016206693 | A1 | * | 12/2016 | A42B 3/0466 |
| WO | WO-2019053757 | A1 | * | 3/2019 | |
| WO | WO-2020095337 | A1 | * | 5/2020 | A42B 3/046 |
| WO | WO-2020095337 | A9 | * | 12/2020 | A42B 3/046 |
| WO | WO-2021183552 | A1 | * | 9/2021 | A42B 3/0466 |

\* cited by examiner (a)     (b)

(a)

(b)

PERSONAL MOBILITY DEVICE AND CONTROL METHOD THEREOF

CROSS-REFERENCE TO RELATED APPLICATION

This application claims under 35 U.S.C. § 119 the benefit of Korean Patent Application No. 10-2020-0030642, filed on Mar. 12, 2020 in the Korean Intellectual Property Office, the entire contents of which are incorporated herein by reference.

BACKGROUND

1. Technical Field

The disclosure relates to a shared personal mobility device and a control method thereof.

2. Description of the Related Art

Recently, as the market for a personal mobility device corresponding to a single-person electric-powered device has increased, the number of users of personal mobility devices has increased.

In the case of small personal mobility devices, the probability of an accident is high due to the small size, and the risk of injury to the user is high when an accident occurs. Accordingly, in some countries, a helmet is required by law when using a personal mobility device.

Nevertheless, some users do not wear a helmet, and even when a public helmet is provided, the utilization rate of the helmet is low. In addition, in the case of public helmets, there is also a problem of theft.

SUMMARY

Therefore, it is an aspect of the present disclosure to provide a personal mobility device that includes a helmet (for example, when renting the personal mobility device), and can improve user safety based on an output of a sensor provided in the helmet. In addition, a control method of the personal mobility device is provided.

In accordance with one aspect of the disclosure, a personal mobility device includes: a transceiver; a helmet storage device in which a helmet provided with at least one sensor is stored; and a controller configured to control the transceiver to be wirelessly connected to the helmet when receiving a signal indicating separation between the helmet storage device and the helmet from the helmet storage device, and to control the transceiver to transmit a signal requesting activation of the at least one sensor to the helmet.

The personal mobility device may further include: a speaker and a display.

The controller may be configured to control at least one of the speaker or the display to output a warning signal when a connection strength between the transceiver and the helmet is less than or equal to a preset value.

The controller may be configured to determine whether the user wears the helmet based on an output of the at least one sensor received from the helmet.

The controller may be configured to control at least one of the speaker or the display to output a warning signal when the user does not wear the helmet.

The controller may be configured to limit a maximum speed of the personal mobility device to the preset speed when the user does not wear the helmet.

The personal mobility device may further include: a gyro sensor; and an acceleration sensor, and the controller may be configured to determine a driving direction based on an output of each of the gyro sensor and the acceleration sensor, determine an angle corresponding to the driving direction as a reference angle and control at least one of the speaker or the display to output a warning signal when the helmet deviates from the reference angle beyond a preset angle for more than a preset time.

The controller may be configured to determine whether the helmet deviates from the reference angle beyond the preset angle when a driving speed is greater than or equal to a preset speed.

The personal mobility device may further include: a camera configured to photograph a front of a user's face (i.e., a user's face), and the controller may be configured to determine the face of the user based on an output of the camera and control at least one of the speaker or the display to output a warning signal when the face of the user is not identified for a preset time.

The controller may be configured to determine whether the face of the user is identified during the preset time when a driving speed is greater than or equal to the preset speed.

In accordance with one aspect of the disclosure, a control method of a personal mobility device including a transceiver and a helmet storage device in which a helmet provided with at least one sensor is stored, the method includes: controlling the transceiver to be wirelessly connected to the helmet when receiving a signal indicating the separation between the helmet storage device and the helmet from the helmet storage device; and controlling the transceiver to transmit a signal requesting the activation of the at least one sensor to the helmet.

The personal mobility device may further include: a speaker; and a display.

The control method may further include: controlling at least one of the speaker or the display to output a warning signal when a connection strength between the transceiver and the helmet is less than or equal to a preset value.

The control method may further include: determining whether the user wears the helmet based on an output of the at least one sensor received from the helmet.

The control method may further include: controlling at least one of the speaker or the display to output a warning signal when the user does not wear the helmet.

The control method may further include: limiting a maximum speed of the personal mobility device to the preset speed when the user does not wear the helmet.

The personal mobility device may further include: a gyro sensor; and an acceleration sensor, and the method may further include: determining a driving direction based on an output of each of the gyro sensor and the acceleration sensor; determining an angle corresponding to the driving direction as a reference angle; and controlling at least one of the speaker or the display to output a warning signal when the helmet deviates from the reference angle beyond the preset angle for more than a preset time.

The control method may further include: determining whether the helmet deviates from the reference angle beyond the preset angle when a driving speed is greater than or equal to a preset speed.

The personal mobility device may further include: a camera configured to photograph a user's face, and the method may further include: determining a face of a user based on an output of the camera; and controlling at least one of the speaker or the display to output a warning signal when the face of the user is not identified for a preset time.

The control method may further include: determining whether the face of the user is identified during the preset time when a driving speed is greater than or equal to the preset speed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
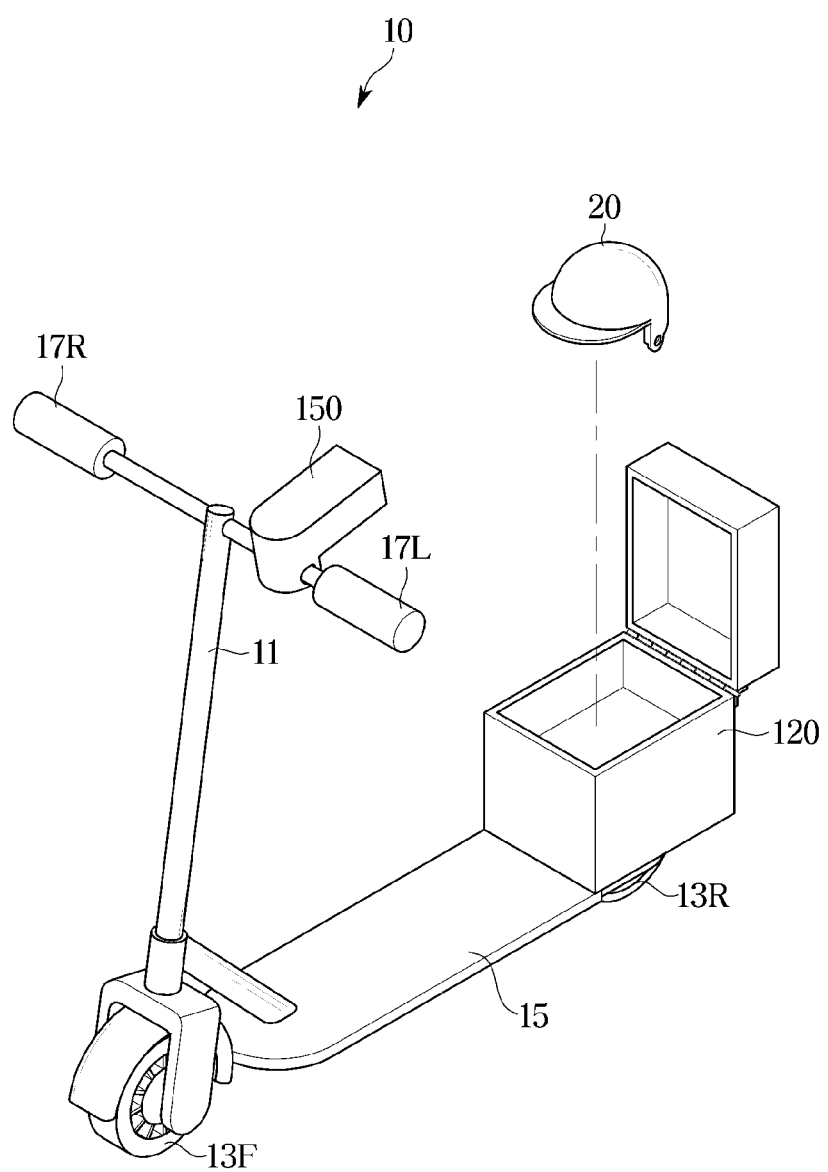
FIG. 1 is an example illustrating the appearance of a personal mobility device according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like reference numerals refer to like elements throughout the specification. Not all elements of embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

An identification code is used for the convenience of the description but is not intended to illustrate the order of each step. Each of the steps may be implemented in an order different from the illustrated order unless the context clearly indicates otherwise.

Hereinafter, embodiments of a personal air vehicle and a control method thereof according to an aspect will be described in detail with reference to the accompanying drawings.

FIG. 1 is an example illustrating the appearance of a personal mobility device according to an embodiment of the present disclosure.

A personal mobility device according to an embodiment refers to a small mobility device for one person or two people capable of driving with electric power such as an electric kickboard, an electric bicycle, and an electric wheel. For a detailed description, in the embodiment described below, a case in which the personal mobility device is an electric kickboard will be described as an example.

Referring to FIG. 1, the personal mobility device 10 includes a body 11, a left handle 17L and a right handle 17R provided on the top of the body 11, a front wheel 13F provided on the bottom of the body 11, a footrest 15 extending from the bottom of the body 11 to the rear of the front wheel 13F and a rear wheel 13R provided at the rear of the footrest 15.

The user of the personal mobility device 10 may stand on the footrest 15 and drive while holding the left handle 17L and right handle 17R, and manipulate the left handle 17L and right handle 17R to adjust driving direction.

The personal mobility device 10 may further include a helmet storage device 120 in which the helmet 20 provided with at least one sensor is stored, according to an embodiment.

The helmet storage device 120 is provided in a box shape according to an embodiment, and may store the helmet 20 therein, and may be separated or integrated with the helmet 20 by opening or closing the opening/closing part (cover) with an opening/closing device (not shown).

The helmet storage device 120, as shown in FIG. 1, may be provided on top of the rear wheel (13R) while being behind the footrest 15. However, the location of the helmet storage device 120 is not limited thereto, and may be located without limitation as long as it is a location capable of storing the helmet 20.

In addition, according to an embodiment, the personal mobility device 10 optionally may not include the helmet storage device 120, and the helmet storage device 120 may be provided outside the personal mobility device 10 separately from the personal mobility device 10. Hereinafter, it will be described as an example that the personal mobility device 10 includes a helmet storage device 120.

In addition, the personal mobility device 10, according to an embodiment, may further include a camera 150 for photographing a user's face, and the camera 150 may be provided, for example, in a bar provided with a left handle 17L and a right handle 17R. However, the camera 150 may be positioned without limitation as long as it is a location capable of photographing the user's face.

Figure 2:
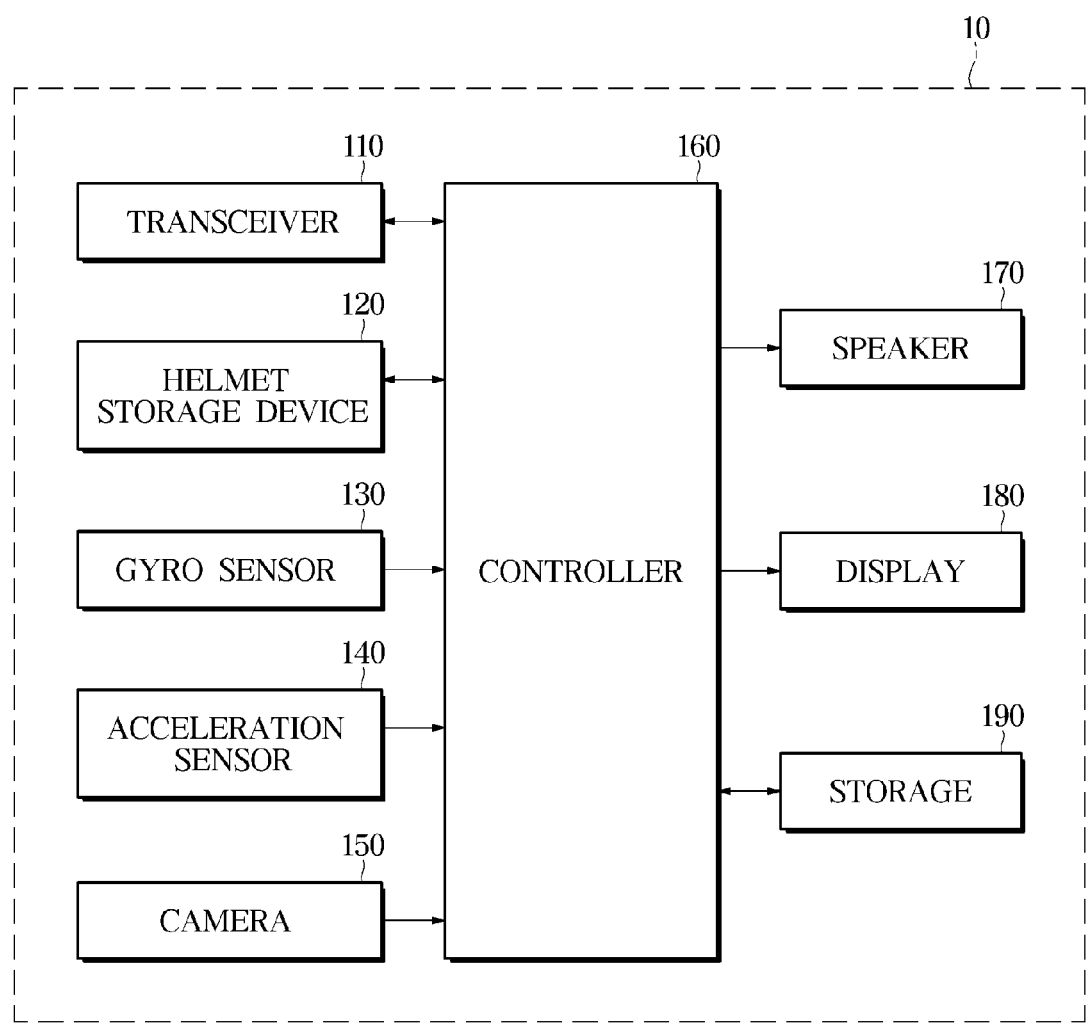
FIG. 2 is a control block diagram of a personal mobility device according to an embodiment of the present disclosure.

FIG. 2 is a control block diagram of personal mobility according to an embodiment of the present disclosure.

Referring to FIG. 2, the personal mobility device 10 according to an embodiment may include a transceiver 110 for communicating with an external device, a helmet storage device 120 capable of storing the helmet 20, a gyro sensor 130 for measuring angular velocity, an acceleration sensor 140 for measuring acceleration, a camera 150 capable of photographing the user's face, a controller 160 for controlling the operation of the personal mobility device 10, a speaker 170, a display 180, and a storage 190 for storing various information necessary for control.

The transceiver 110 according to an embodiment may be wirelessly connected to the helmet 20 through short-range wireless communication (e.g., Bluetooth, etc.) to transmit and receive data. To this end, the transceiver 110 may include a communication module of a known type.

The helmet storage device 120 according to an embodiment includes a storage box capable of storing the helmet 20 and may be separated from the helmet 20 according to operation of the opening/closing device (locking device).

The helmet storage device 120 is connected to the controller 160 by wired communication or wireless communication to exchange data with the controller 160. The helmet storage device 120 may transmit a signal indicating the separation between the helmet storage device 120 and the helmet 20 to the controller 160 when the helmet 20 is separated. For each of wired communication and wireless communication, a communication protocol of a known type may be used, and the transceiver 110 may be used.

For example, when it is determined that the operation of the opening/closing device (locking device) is opened based on an output of the sensor provided in the opening/closing device, the helmet storage device 120 may determine that the helmet 20 has been taken out of the storage box, and transmit a signal indicating the separation between the helmet storage device 120 and the helmet 20 to the controller 160.

In addition, the helmet storage device 120 may further include a charging device (not shown) connected to the helmet 20. When the charging device and the helmet 20 are separated, the helmet storage device 120 determines that the helmet 20 is taken out of the storage box and transmits a signal indicating the separation between the helmet storage device 120 and the helmet 20 to the controller 160.

The helmet storage device 120 may include at least one memory in which programs for performing the above-described operations and operations described below are stored, and at least one processor for executing the stored programs. In the case of a plurality of memory and processors, it is possible that they are integrated in one chip, and it is also possible to be provided in a physically separate location. In addition, the helmet storage device 120 may include a communication module for data transmission and reception.

In particular, the helmet 20 may include at least one sensor. For example, helmet 20 may include at least one of a biometric sensors capable of detecting biological signals (e.g., electroencephalogram (EEG) sensor, galvanic skin response (GSR) sensor, heart rate (HR) sensor, etc.), a gyro sensor that may detect the angular velocity of the helmet 20, or an acceleration sensor that may detect the acceleration of the helmet 20.

The gyro sensor 130 according to an embodiment may detect the angular velocity of the personal mobility device 10, and for this purpose, a gyro sensor of a known type may be included.

The acceleration sensor 140 according to an embodiment may detect the acceleration of the personal mobility device 10, and for this purpose, an acceleration sensor of a known type may be included.

The camera 150 according to an embodiment may obtain a user's face of the personal mobility device 10, that is, a driver's face, and obtain image data on the user's face. To this end, the camera 150 may include a camera of a known type.

When receiving a signal indicating the separation between the helmet storage device 120 and the helmet 20 from the helmet storage device 120, the controller 160 according to an embodiment may determine that the helmet 20 is separated from the helmet storage device 120, and may control the transceiver 110 to be wirelessly connected to the helmet 20.

The controller 160 according to an embodiment may control the transceiver 110 to transmit a signal requesting the activation of at least one sensor provided in the helmet 20 after being connected wirelessly with helmet 20 or while being wirelessly connected to the helmet 20.

Through this, when the helmet 20 is taken out and separated from the helmet storage device 120, the helmet 20 may activate the sensor provided based on the signal from the personal mobility device 10. That is, the helmet 20 may control the sensor to start a sensing operation. The helmet 20 may include a communication module for short-range communication with the personal mobility device 10.

However, according to an embodiment, the helmet 20 may automatically activate a sensor provided when it is separated from the helmet storage device 120 regardless of a signal from the personal mobility device 10.

When a connection strength between the transceiver 110 and the helmet 20 is less than or equal to a preset value, the controller 160 according to an embodiment determines that the helmet 20 is spaced apart from the personal mobility device 10 and may control at least one of the speaker 170 or the display 180 to output a warning signal for theft prevention.

The controller 160 according to an embodiment may determine whether the user wears the helmet 20 based on an output of at least one sensor received from the helmet 20. Specifically, when the sensor of the helmet 20 outputs a bio-signal (e.g., EEG, GSR, HR, etc.), the controller 160 may determine that the user wears the helmet 20, and may determine that the user does not wear the helmet 20 when there is no bio-signal output from the helmet 20 sensor.

The controller 160 according to an embodiment may control at least one of the speaker 170 or the display 180 to output a warning signal for not wearing a helmet when the user does not wear the helmet 20.

In addition, the controller 160 according to an embodiment may limit a maximum speed of the personal mobility device 10 to a preset speed (e.g., 8 km/h) when the user does not wear the helmet 20.

The controller 160 according to an embodiment may determine whether the user is looking toward the front based on the angle of the helmet 20.

Specifically, the controller 160 may determine the driving direction of the personal mobility device 10 based on the outputs of the gyro sensor 130 and the acceleration sensor 140 and may determine the angle of the helmet 20 corresponding to the driving direction as a reference angle.

Subsequently, when the helmet 20 deviates from the reference angle beyond a preset angle for more than the preset time, the controller 160 determines that the user is not looking toward the front, and may control at least one of the speaker 170 or the display 180 to output a warning signal for front looking.

According to an embodiment, when a driving speed of the personal mobility device 10 is greater than or equal to the preset speed, the controller 160 may initiate an operation of determining whether the user is looking forward, based on the angle of the helmet 20.

That is, the controller 160 may determine whether the helmet 20 deviates from a reference angle to the preset angle or more when the driving speed is greater than or equal to the preset speed.

The controller 160 according to an embodiment may determine whether the user is looking forward, based on image data obtained through the camera 150.

Specifically, the controller 160 may determine a front of a user's face (i.e., a user's face) based on the output of the camera 150, and when the user's face is not identified for a preset time based on image data received from the camera 150, the controller 160 may control at least one of the speaker 170 or the display 180 to output a warning signal.

According to an embodiment, when the driving speed of the personal mobility device 10 is greater than or equal to the preset speed, the controller 160 may initiate an operation of determining whether the user is looking forward based on image data obtained through the camera 150.

That is, the controller 160 may determine whether the face of the user is identified during the preset time when the driving speed is greater than or equal to the preset speed.

The controller 160 may include at least one memory in which programs for performing the above-described operations and operations described below are stored, and at least one processor for executing the stored programs. In the case of a plurality of memory and processors, it is possible that they are integrated in one chip, and it is also possible to be provided in a physically separate location.

The speaker 170 according to an embodiment may output a warning sound corresponding to a warning signal, and may be located without limitation as long as it is a location capable of transmitting a warning sound to a user, and may include a speaker of a known type.

The display 180 according to an embodiment may display a warning message (language or symbol) corresponding to a warning signal, and may be located without limitation as long as it may deliver a warning message to a user, and a display of a known type may be included.

The storage 190 according to an embodiment may store information on the connection strength between the transceiver 110 and helmet 20 for a warning signal for theft prevention, information on the angle of the helmet 20 for a warning signal of forward gaze, various information necessary for the control of the personal mobility device 10, such as image data obtained from the camera 150.

At least one component may be added or deleted in response to the performance of the components of the personal mobility device 10 shown in FIG. 2. In addition, it will be readily understood by those skilled in the art that the mutual location of components may be changed in response to the performance or structure of the system.

Figure 3:
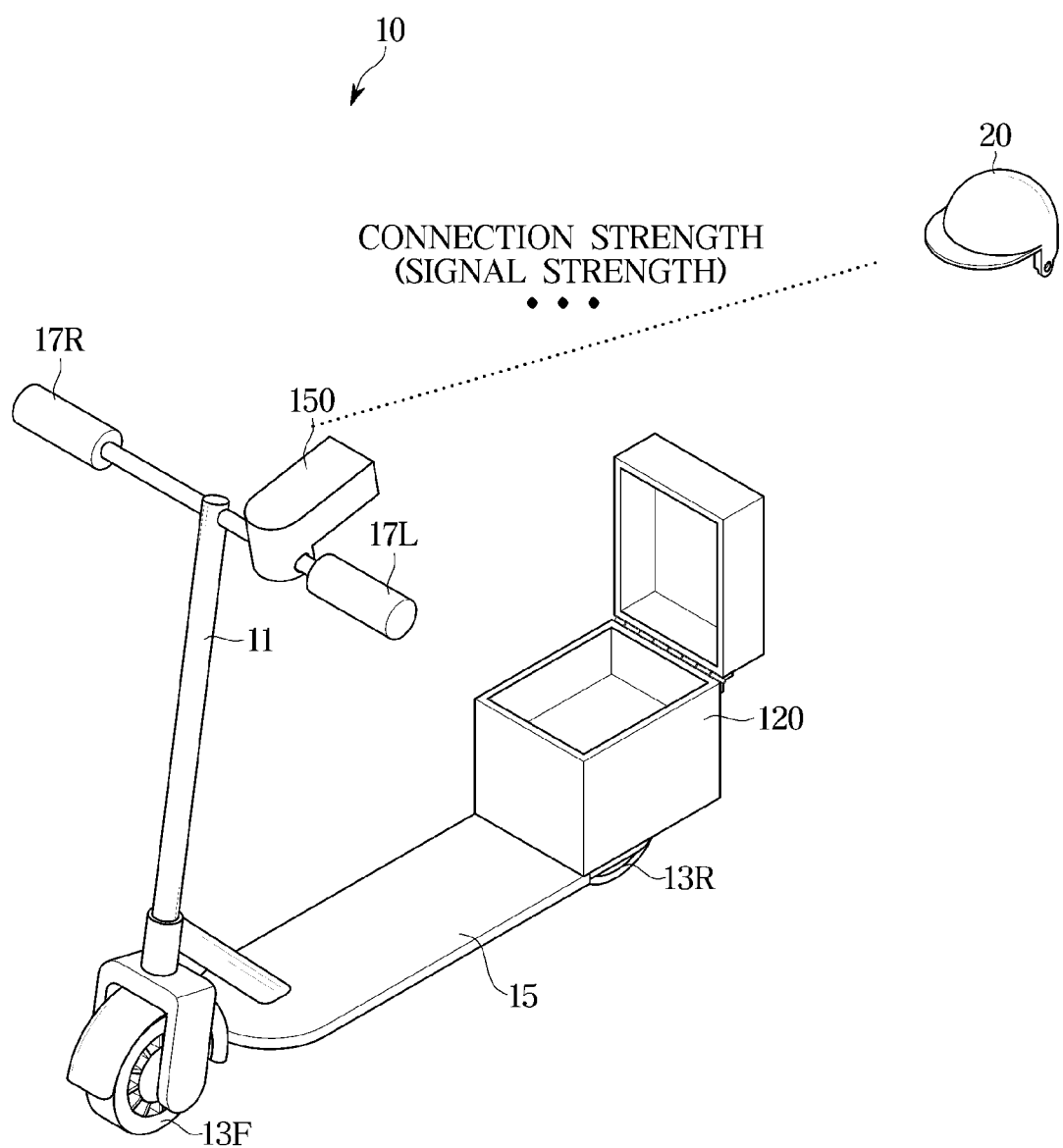
FIG. 3 is a diagram for illustrating a case in which a personal mobility device according to an embodiment of the present disclosure is wirelessly connected to a helmet.

FIG. 3 is a diagram for illustrating a case in which a personal mobility device according to an embodiment of the present disclosure is wirelessly connected to a helmet.

Referring to FIG. 3, when receiving a signal indicating the separation between the helmet storage device 120 and the helmet 20 from the helmet storage device 120, the controller 160 according to an embodiment may determine that the helmet 20 is separated from the helmet storage device 120, and may control the transceiver 110 to be wirelessly connected to the helmet 20.

The controller 160 according to an embodiment may control the transceiver 110 to transmit a signal requesting the activation of at least one sensor provided in the helmet 20 after being connected wirelessly with helmet 20 or while being wirelessly connected to the helmet 20.

Through this, when the helmet 20 is taken out and separated from the helmet storage device 120, the helmet 20 may activate the sensor provided based on the signal from the personal mobility device 10. That is, the helmet 20 may control the sensor to start a sensing operation. The helmet 20 may include a communication module for short-range communication with the personal mobility device 10.

However, according to an embodiment, the helmet 20 may automatically activate a sensor provided when it is separated from the helmet storage device 120 regardless of a signal from the personal mobility device 10.

When the connection strength between the transceiver 110 and the helmet 20 is less than or equal to a preset value, the controller 160 according to an embodiment determines that the helmet 20 is spaced apart from the personal mobility device 10 and may control at least one of the speaker 170 or the display 180 to output a warning signal for theft prevention.

The preset value may correspond to the connection strength when the helmet 20 is located at a preset distance from the personal mobility device 10 and when the connection strength between the transceiver 110 and the helmet 20 is less than or equal to a preset value, the controller 160 determines that the helmet 20 is farther than a preset distance from the personal mobility device 10, and determines that the helmet 20 is at risk of being stolen, and may control at least one of the speaker 170 or the display 180 to output a warning signal.

Figure 4:
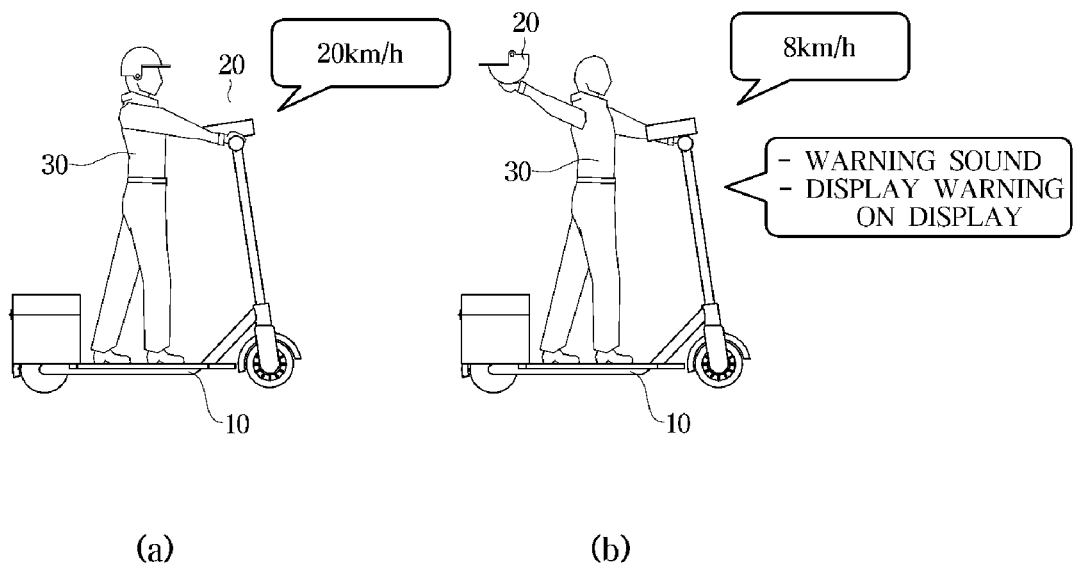
FIG. 4 is a diagram for illustrating a case in which a personal mobility device according to an embodiment of the present disclosure operates based on whether a user wears a helmet.

FIG. 4 is a diagram for illustrating a case in which a personal mobility device according to an embodiment of the present disclosure operates based on whether a user wears a helmet.

Referring to FIG. 4, the controller 160 according to an embodiment may determine whether the user wears the helmet 20 based on the output of at least one sensor received from the helmet 20.

Specifically, when the sensor of the helmet 20 outputs a bio-signal (e.g., EEG, GSR, HR, etc.), the controller 160 may determine that the user 30 wears the helmet 20, and may determine that the user 30 does not wear the helmet 20 when there is no bio-signal output from the helmet 20 sensor.

As shown in (b) of FIG. 4, the controller 160 according to an embodiment may control at least one of the speaker 170 or the display 180 to output a warning signal for not wearing a helmet when the user 30 does not wear the helmet 20.

In addition, as shown in (b) of FIG. 4, the controller 160 according to an embodiment may limit the maximum speed of the personal mobility device 10 to a preset speed (e.g., 8 km/h) when the user does not wear the helmet 20.

That is, when the user 30 does not wear a helmet 20 ((b) of FIG. 4), the controller 160 may adjust the maximum speed at a speed (e.g., 8 km/h) lower than the maximum speed (e.g., 20 km/h) when the user 30 wears the helmet 20 ((a) of FIG. 4).

Figure 5:
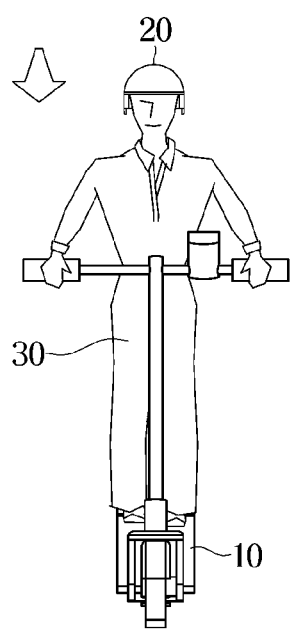
FIG. 5 is a diagram for illustrating a case in which a personal mobility device according to an embodiment of the present disclosure determines whether a user is looking ahead based on a position of a helmet.
Figure 5:
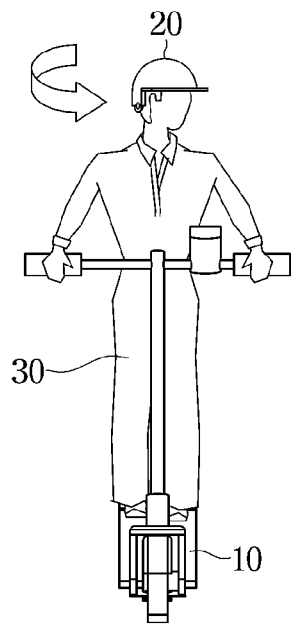

FIG. 5 is a diagram for illustrating a case in which a personal mobility device according to an embodiment of the present disclosure determines whether a user is looking ahead based on a position of a helmet.

Referring to FIG. 5, The controller 160 according to an embodiment may determine whether the user 30 is looking toward the front based on the angle of the helmet 20.

Specifically, the controller 160 may determine the driving direction of the personal mobility device 10 based on the outputs of the gyro sensor 130 and the acceleration sensor 140 and may determine the angle ((a) of FIG. 5) of the helmet 20 corresponding to the driving direction as a reference angle.

Subsequently, when the helmet 20 deviates from the reference angle beyond the preset angle for more than the preset time ((b) of FIG. 5), the controller 160 determines that the user 30 is not looking toward the front, and may control at least one of the speaker 170 or the display 180 to output a warning signal for front looking.

According to an embodiment, when the driving speed of the personal mobility device 10 is greater than or equal to the preset speed, the controller 160 may initiate an operation of determining whether the user 30 is looking forward, based on the angle of the helmet 20.

That is, the controller 160 may determine whether the helmet 20 deviates from a reference angle to a preset angle or more when the driving speed is greater than or equal to a preset speed.

Figure 6:
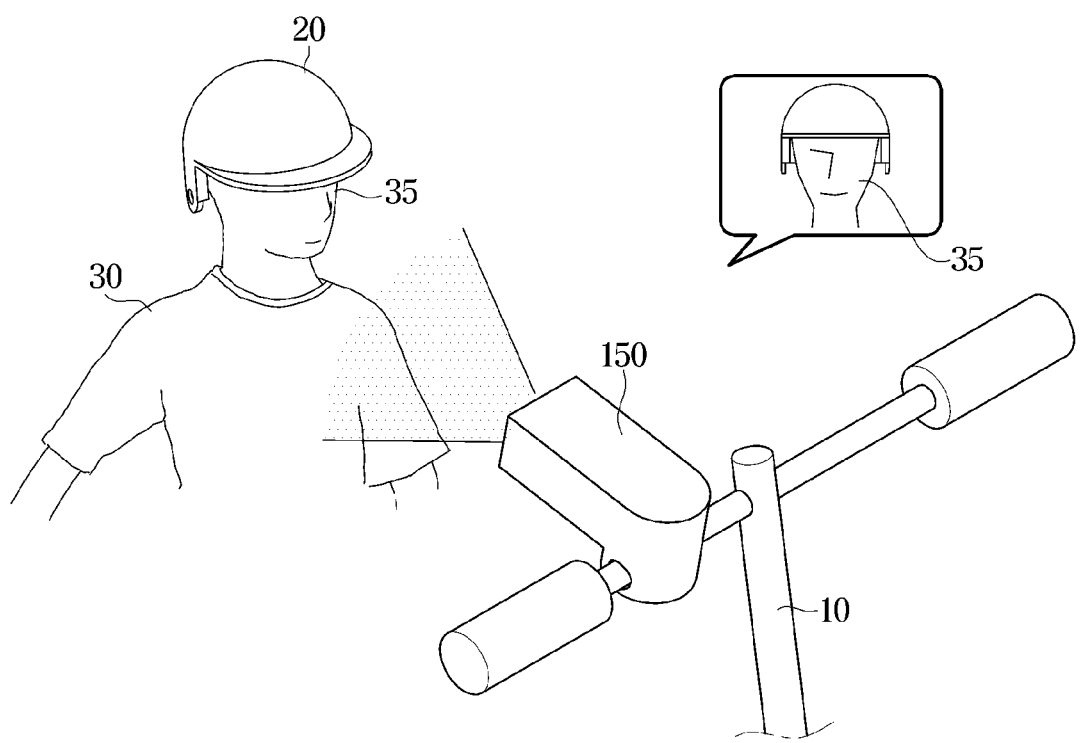
FIG. 6 is a diagram for illustrating a case in which a personal mobility device according to an embodiment of the present disclosure determines whether a user is looking ahead based on a camera.

FIG. 6 is a diagram for illustrating a case in which a personal mobility device according to an embodiment of the present disclosure determines whether a user is looking ahead based on a camera.

Referring to FIG. 6, the controller 160 according to an embodiment may determine whether the user 30 is looking forward, based on image data obtained through the camera 150.

Specifically, the controller 160 may determine the face 35 of the user 30 based on the output of the camera 150, and when the face 35 of the user 30 is not identified for a preset time based on image data received from the camera 150, the controller 160 may control at least one of the speaker 170 or the display 180 to output a warning signal.

According to an embodiment, when the driving speed of the personal mobility device 10 is greater than or equal to the preset speed, the controller 160 may initiate an operation of determining whether the user 30 is looking forward based on image data obtained through the camera 150.

That is, the controller 160 may determine whether the face 35 of the user 30 is identified during the preset time when the driving speed is greater than or equal to the preset speed.

Hereinafter, a control method of the personal mobility device 10 according to an embodiment will be described. The personal mobility device 10 according to the above-described embodiment may be applied to the control method of the personal mobility device 10 described later. Therefore, the contents described with reference to FIGS. 1 to 6 are equally applicable to the control method of the personal mobility device 10 according to an embodiment even if there is no special mention.

Figure 7:
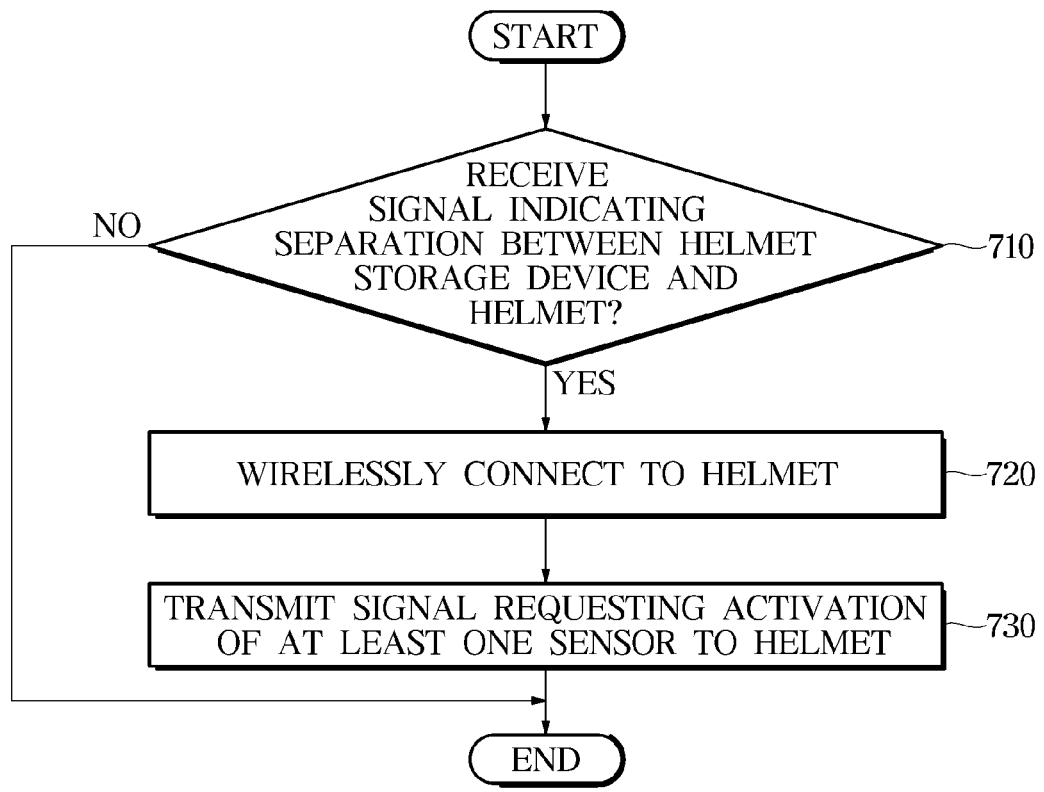
FIG. 7 is a flowchart illustrating a case in which a sensor provided in a helmet is activated among a control method of a personal mobility device according to an embodiment of the present disclosure.

FIG. 7 is a flowchart illustrating a case in which a sensor provided in a helmet is activated among a control method of a personal mobility device according to an embodiment of the present disclosure.

Referring to FIG. 7, when receiving a signal indicating separation between the helmet storage device 120 and the helmet 20 (YES in 710), the personal mobility device 10 according to an embodiment may be wirelessly connected to the helmet 20 (720).

That is, when receiving a signal indicating the separation between the helmet storage device 120 and the helmet 20 from the helmet storage device 120, the controller 160 may determine that the helmet 20 is separated from the helmet storage device 120, and may control the transceiver 110 to be wirelessly connected to the helmet 20.

The personal mobility device 10 according to an embodiment may transmit a signal requesting the activation of at least one sensor to the helmet 20 (730).

That is, the controller 160 may control the transceiver 110 to transmit a signal requesting the activation of at least one sensor provided in the helmet 20 after being connected wirelessly with helmet 20 or while being wirelessly connected to the helmet 20.

Through this, when the helmet 20 is taken out and separated from the helmet storage device 120, the helmet 20 may activate the sensor provided based on the signal from the personal mobility device 10. That is, the helmet 20 may control the sensor to start a sensing operation.

Figure 8:
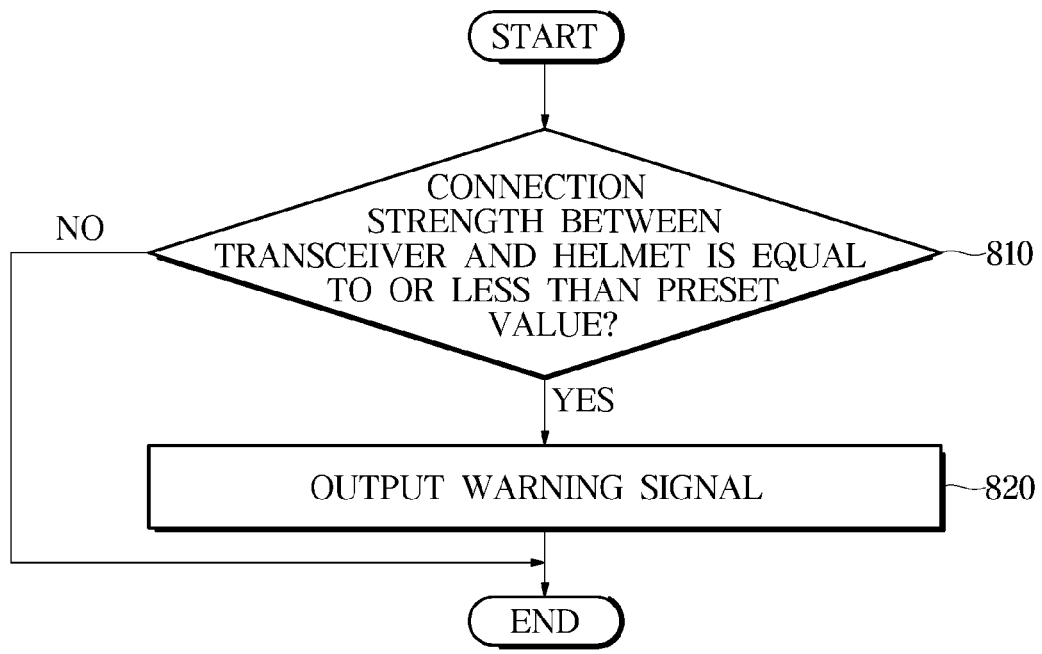
FIG. 8 is a flowchart illustrating a case of warning of the theft of a helmet among a control method of a personal mobility device according to an embodiment of the present disclosure.

FIG. 8 is a flowchart illustrating a case of warning of the theft of a helmet among a control method of a personal mobility device according to an embodiment of the present disclosure.

Referring to FIG. 8, when the connection strength between the transceiver 110 and the helmet 20 is equal to or less than a preset value (YES in 810), the personal mobility device 10 according to an embodiment may output a warning signal (820).

That is, when the connection strength between the transceiver 110 and the helmet 20 is less than or equal to a preset value, the controller 160 determines that the helmet 20 is spaced apart from the personal mobility device 10 and may control at least one of the speaker 170 or the display 180 to output a warning signal for theft prevention.

Figure 9:
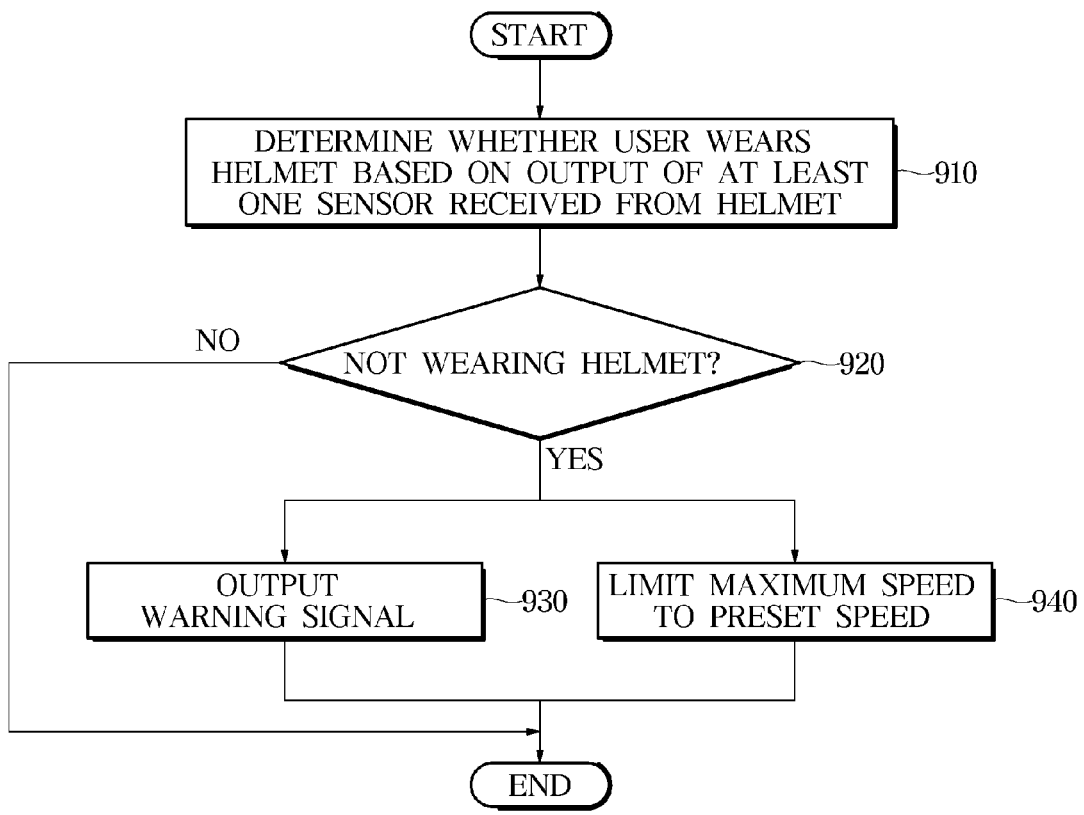
FIG. 9 is a flowchart illustrating a case in which an operation is controlled based on whether or not a helmet is worn among a control method of a personal mobility device according to an embodiment of the present disclosure.

FIG. 9 is a flowchart illustrating a case in which an operation is controlled based on whether or not a helmet is worn among a control method of a personal mobility device according to an embodiment of the present disclosure.

Referring to FIG. 9, a personal mobility device 10 according to an embodiment may determine whether the user wears the helmet 20 based on the output of at least one sensor received from the helmet 20 (910).

Specifically, when the sensor of the helmet 20 outputs a bio-signal (e.g., EEG, GSR, HR, etc.), the controller 160 may determine that the user wears the helmet 20, and may determine that the user does not wear the helmet 20 when there is no bio-signal output from the helmet 20 sensor.

When the user 30 does not wear the helmet 20 (YES in 920), the personal mobility device 10 according to an embodiment may output a warning signal (930), and may limit the maximum speed to a preset speed (940).

That is, when the user does not wear a helmet 20, the controller 160 may control at least one of the speaker 170 or the display 180 to output a warning signal for not wearing a helmet and may limit the maximum speed of the personal mobility device 10 to a preset speed (e.g., 8 km/h) when the user does not wear the helmet 20.

Figure 10:
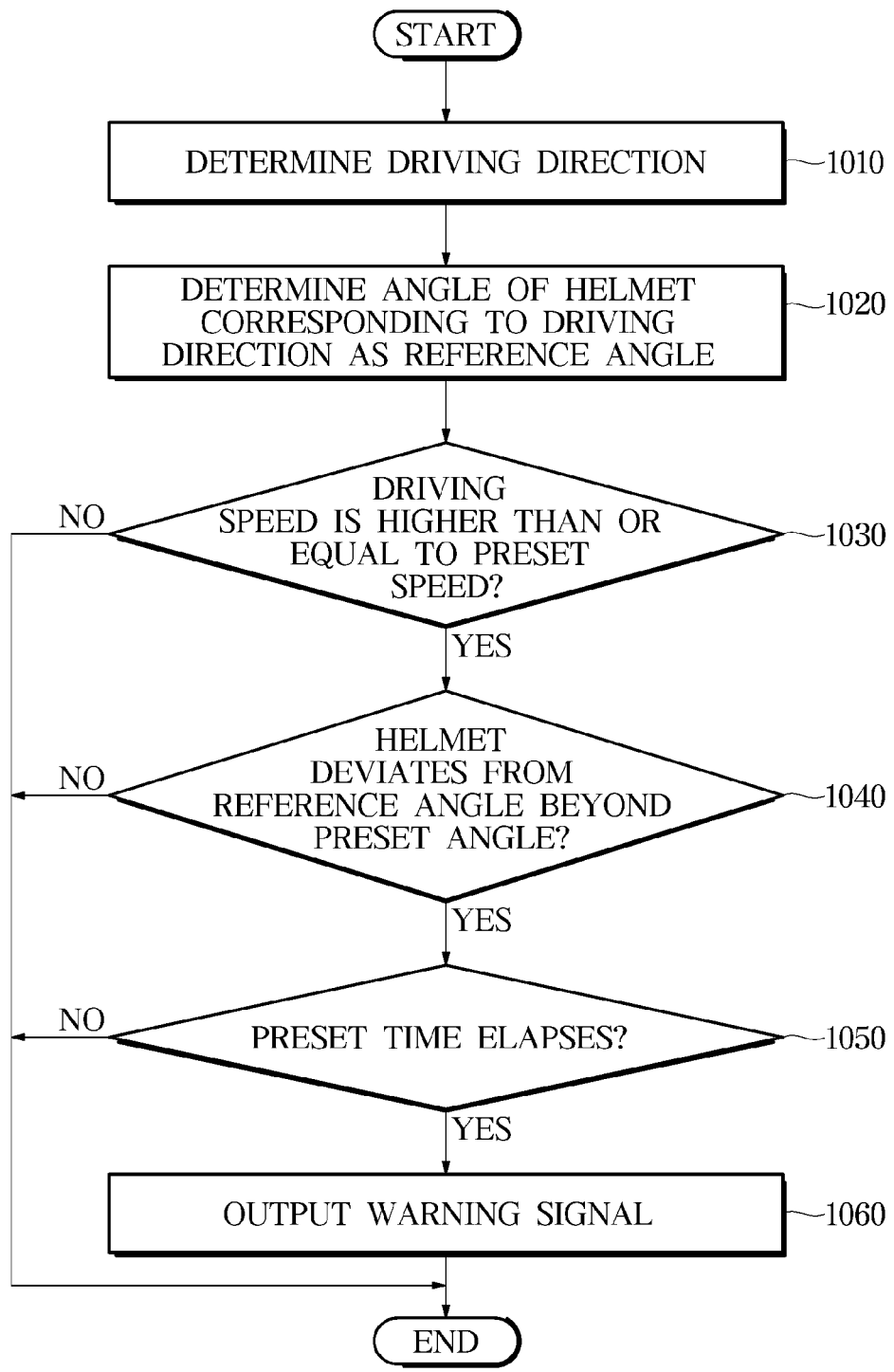
FIG. 10 is a flowchart illustrating a case in which a forward gaze is warned based on an angle of a helmet among a control method of a personal mobility device according to an embodiment of the present disclosure.

FIG. 10 is a flowchart illustrating a case in which a forward gaze is warned based on an angle of a helmet among a control method of a personal mobility device according to an embodiment of the present disclosure.

Referring to FIG. 10, the personal mobility device 10 according to an embodiment may determine a driving direction (1010) and determine an angle of the helmet 20 corresponding to the driving direction as a reference angle (1020).

Specifically, the controller 160 may determine the driving direction of the personal mobility device 10 based on the outputs of the gyro sensor 130 and the acceleration sensor 140 and may determine the angle of the helmet 20 corresponding to the driving direction as a reference angle.

When the driving speed is higher than or equal to the preset speed (YES in 1030), the helmet 20 deviates from the reference angle beyond the preset angle (YES in 1040), and the preset time elapses (YES in 1050), the personal mobility device 10 according to an embodiment may output a warning signal (1060).

That is, when the helmet 20 deviates from the reference angle beyond the preset angle for more than the preset time, the controller 160 determines that the user 30 is not looking toward the front, and may control at least one of the speaker 170 or the display 180 to output a warning signal for front looking.

Figure 11:
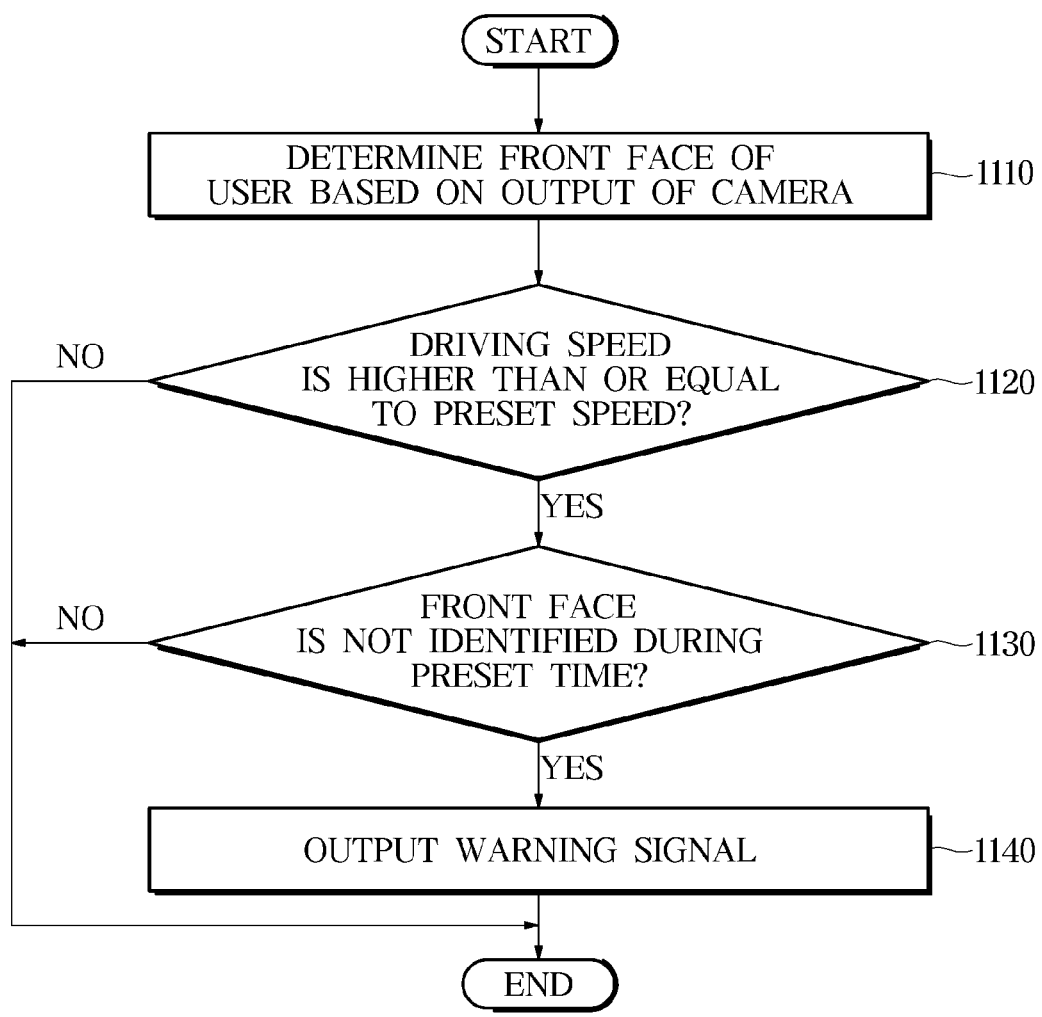
FIG. 11 is a flowchart illustrating a case in which a forward gaze is warned based on a camera among a control method of a personal mobility device according to an embodiment of the present disclosure.

FIG. 11 is a flowchart illustrating a case in which a forward gaze is warned based on a camera among a control method of a personal mobility device according to an embodiment of the present disclosure.

Referring to FIG. 11, the personal mobility device 10 according to an embodiment may determine the face 35 of the user 30 based on the output of the camera 150 (1110).

When the driving speed is higher than or equal to the preset speed (YES in 1120), and the face 35 is not identified during the preset time (YES in 1130), the personal mobility device 10 according to an embodiment may output a warning signal (1140).

Specifically, the controller 160 may determine the face of the user based on the output of the camera 150, and when the user's face is not identified for a preset time based on image data received from the camera 150, the controller 160 may control at least one of the speaker 170 or the display 180 to output a warning signal.

According to the personal mobility device and control method thereof according to one aspect, it is possible to provide a helmet (e.g., when renting the personal mobility device 10), and improve the user's safety based on the output of the sensor provided in the helmet.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A personal mobility device, comprising:
a transceiver;
a helmet storage device in which a helmet provided with at least one sensor is stored; and
a controller configured to control the transceiver to be wirelessly connected to the helmet in response to receiving a signal indicating separation between the helmet storage device and the helmet from the helmet storage device, and to control the transceiver to transmit a signal requesting activation of the at least one sensor to the helmet.

2. The personal mobility device according to claim 1, further comprising:
a speaker; and
a display.

3. The personal mobility device according to claim 2, wherein the controller is configured to control at least one of the speaker or the display to output a warning signal when a connection strength between the transceiver and the helmet is less than or equal to a preset value.

4. The personal mobility device according to claim 2, wherein the controller is configured to determine whether a user wears the helmet based on an output of the at least one sensor received from the helmet.

5. The personal mobility device according to claim 4, wherein the controller is configured to control at least one of the speaker or the display to output a warning signal when the user does not wear the helmet.

6. The personal mobility device according to claim 4, wherein the controller is configured to limit a maximum speed of the personal mobility device to a preset speed when the user does not wear the helmet.

7. The personal mobility device according to claim 2, further comprising:
a gyro sensor; and
an acceleration sensor,
wherein the controller is configured to determine a driving direction based on an output of each of the gyro sensor and the acceleration sensor, determine an angle corresponding to the driving direction as a reference angle, and control at least one of the speaker or the display to output a warning signal when the helmet deviates from the reference angle beyond a preset angle for more than a preset time.

8. The personal mobility device according to claim 7, wherein the controller is configured to determine whether the helmet deviates from the reference angle beyond the preset angle when a driving speed is greater than or equal to a preset speed.

9. The personal mobility device according to claim 2, further comprising:
a camera configured to photograph a face of a user,
wherein the controller is configured to determine the face of the user based on an output of the camera and control at least one of the speaker or the display to output a warning signal when the face of the user is not identified for a preset time.

10. The personal mobility device according to claim 9, wherein the controller is configured to determine whether the face of the user is identified during the preset time when a driving speed is greater than or equal to a preset speed.

11. A control method of a personal mobility device comprising a transceiver and a helmet storage device in which a helmet provided with at least one sensor is stored, the method comprises:
controlling the transceiver to be wirelessly connected to the helmet in response to receiving a signal indicating the separation between the helmet storage device and the helmet from the helmet storage device; and
controlling the transceiver to transmit a signal requesting the activation of the at least one sensor to the helmet.

12. The control method according to claim 11, wherein the personal mobility device further comprises:
a speaker; and
a display.

13. The control method according to claim 12, further comprising:
controlling at least one of the speaker or the display to output a warning signal when a connection strength between the transceiver and the helmet is less than or equal to a preset value.

14. The control method according to claim 12, further comprising:
determining whether a user wears the helmet based on an output of the at least one sensor received from the helmet.

15. The control method according to claim 14, further comprising:
controlling at least one of the speaker or the display to output a warning signal when the user does not wear the helmet.

16. The control method according to claim 14, further comprising:
limiting a maximum speed of the personal mobility device to a preset speed when the user does not wear the helmet.

17. The control method according to claim 12, wherein the personal mobility device further comprises:
a gyro sensor; and
an acceleration sensor,
wherein the method further comprises:
determining a driving direction based on an output of each of the gyro sensor and the acceleration sensor;
determining an angle corresponding to the driving direction as a reference angle; and
controlling at least one of the speaker or the display to output a warning signal when the helmet deviates from the reference angle beyond the preset angle for more than a preset time.

18. The control method according to claim 17, further comprising:
determining whether the helmet deviates from the reference angle beyond the preset angle when a driving speed is greater than or equal to a preset speed.

19. The control method according to claim 12, wherein the personal mobility device further comprises:
a camera configured to photograph a user's face,
wherein the method further comprises:
determining the face of the user based on an output of the camera; and
controlling at least one of the speaker or the display to output a warning signal when the face of the user is not identified for a preset time.

20. The control method according to claim 19, further comprising:
determining whether the face of the user is identified during the preset time when a driving speed is greater than or equal to a preset speed.

* * * * *